United States Patent [19]

Flynn

[11] Patent Number: 5,580,255
[45] Date of Patent: *Dec. 3, 1996

[54] CPR MANNEQUIN

[75] Inventor: Stephen Flynn, Oakville, Canada

[73] Assignee: Vital Signs, Inc., Totowa, N.J.

[ * ] Notice: The term of this patent shall not extend beyond the expiration date of Pat. No. 5,312,259.

[21] Appl. No.: 242,390

[22] Filed: May 13, 1994

Related U.S. Application Data

[63] Continuation of Ser. No. 47,670, Apr. 19, 1993, Pat. No. 5,312,259.

[51] Int. Cl.⁶ ................................................. G09B 23/30
[52] U.S. Cl. ........................................................ 434/265
[58] Field of Search ................................. 434/265, 262, 434/267

[56] References Cited

U.S. PATENT DOCUMENTS

| | | | |
|---|---|---|---|
| 3,049,811 | 8/1962 | Ruben | 434/265 |
| 3,068,590 | 12/1962 | Padellford | 434/265 |
| 3,199,225 | 8/1965 | Robertson et al. | 434/265 |
| 3,562,924 | 2/1971 | Baermann | 434/265 |
| 4,001,950 | 1/1977 | Blumensaadt | 434/265 |
| 4,331,426 | 5/1982 | Sweeney | 434/265 |
| 4,984,987 | 1/1991 | Brault et al. | 434/265 |
| 5,083,559 | 1/1992 | Brault et al. | 434/265 |
| 5,195,896 | 3/1993 | Sweeney et al. | 434/265 |
| 5,312,259 | 5/1994 | Flynn | 434/265 |

FOREIGN PATENT DOCUMENTS

| | | | |
|---|---|---|---|
| 0882545 | 11/1961 | United Kingdom | 434/265 |
| 0934755 | 8/1963 | United Kingdom | 434/265 |
| 0973350 | 10/1964 | United Kingdom | 434/265 |

*Primary Examiner*—Cary E. O'Connor
*Assistant Examiner*—Jeffrey A. Smith
*Attorney, Agent, or Firm*—Joseph A. Giampapa

[57] ABSTRACT

A CPR mannequin for practicing cardiopulmonary resuscitation of a human has a simulated human head and neck portion with an air passage extending from a mouth opening to a neck opening in an end of the neck remote from the head. An inflatable simulated human chest portion is secured to the neck and has an upper flexible wall member, a lower wall member and a flexible bag therebetween and a further air passage connects the air passage in the neck to the flexible bag. The upper flexible wall member simulates a chest which rises and falls with inflation and deflation of the flexible bag.

2 Claims, 5 Drawing Sheets

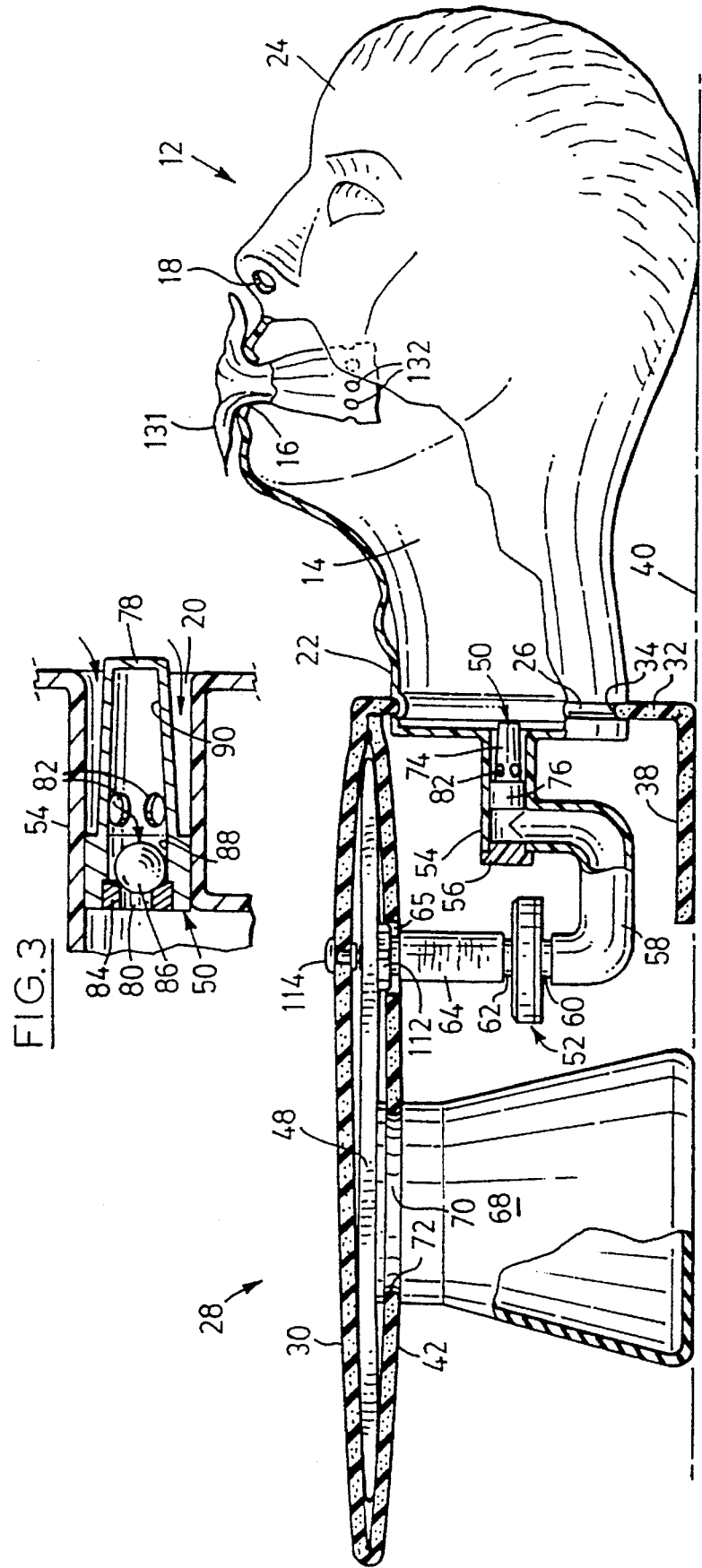

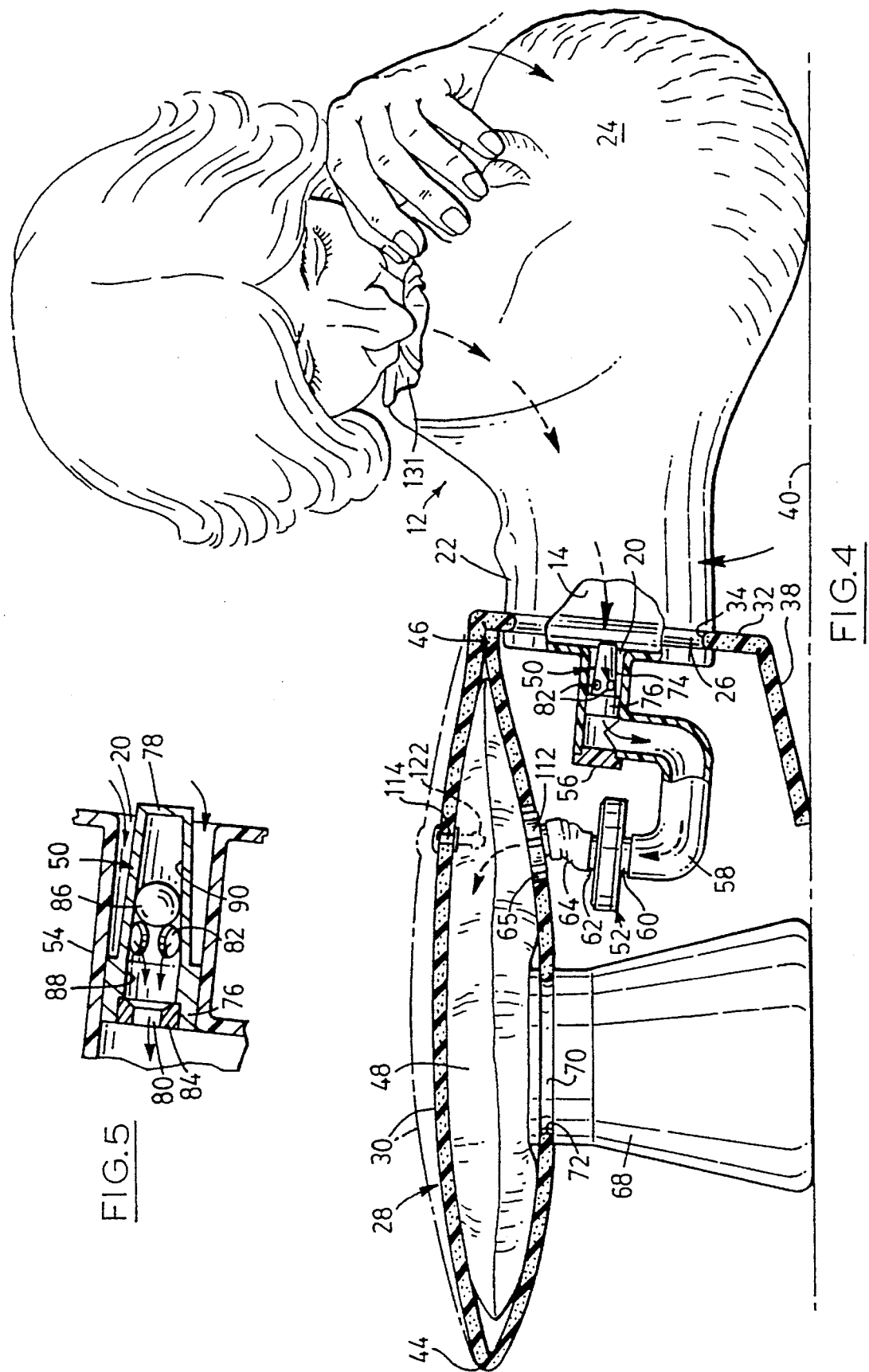

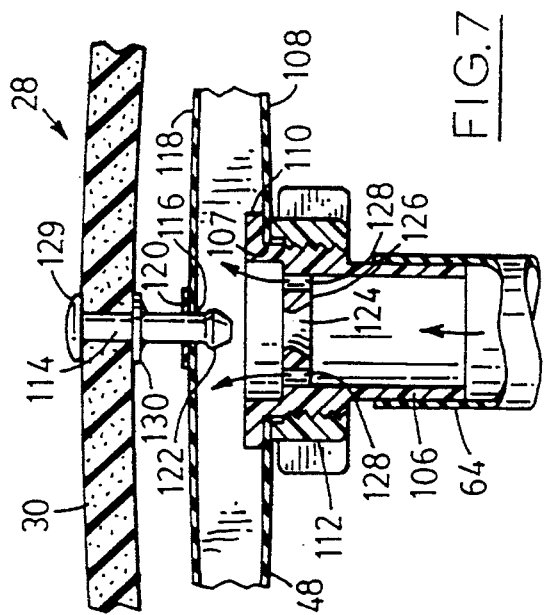
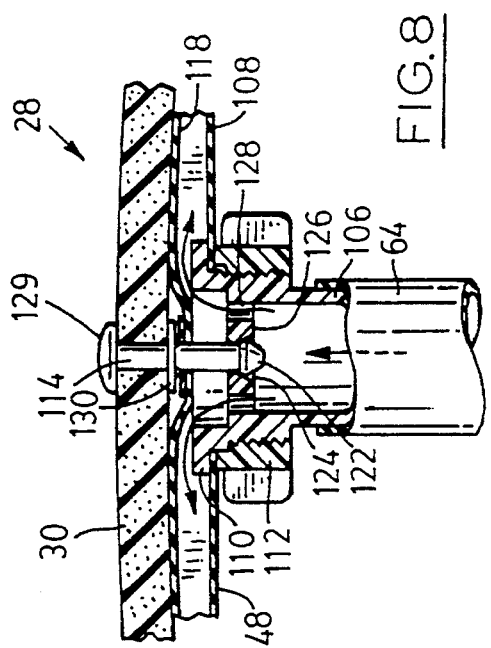
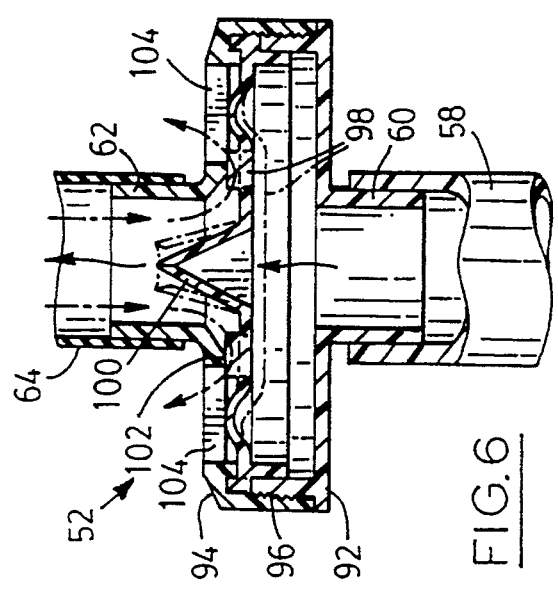

CPR MANNEQUIN

CROSS-REFERENCE TO RELATED APPLICATIONS

This application is a continuation application of U.S. patent application Ser. No. 08/047,670, filed Apr. 19, 1993, now U.S. Pat. No. 5,312,259.

This invention relates to CPR mannequins for practising cardiopulmonary resuscitation of a human.

Various mannequins have been proposed for this purpose but most are either too complex or are too over-simplified.

It is therefore an object of the invention to provide a satisfactory CPR mannequin which is neither unduly complex or over-simplified.

According to the invention, a CPR mannequin for practising cardiopulmonary resuscitation of a human comprises a simulated human head and neck portion with an air passage extending from a mouth opening to neck opening in an end of the neck remote from the head, an inflatable simulated human chest portion secured to the neck and having a flexible wall member simulating a chest which rises and falls with inflation and deflation of the chest portion, the inflatable chest portion having an air capacity representative of a lung capacity of a human adult, and a further air passage connecting the air passage in the neck to the inflatable chest portion.

The mannequin may have a flow control valve assembly in the further air passage operable to permit air blown through the mouth opening to pass through the air passage in the head and neck portion and through the further air passage into the chest portion to inflate the chest portion and cause the flexible chest wall member to rise, the flow control valve assembly causing air from the chest portion when deflating to be released to the atmosphere without passing back into the head and neck portion.

The inflatable chest portion may comprise a releasable retainer which operates before release to reduce the air capacity of the chest portion to a volume representative of the lung capacity of a human child, the releasable retainer being released by air pressure caused by continued blowing of air into the mouth opening when the chest portion has been inflated to an extent representative of the lung capacity of a human child.

An angle responsive air flow prevention device may be located between the mouth opening and the inflatable chest portion to prevent flow of air from the mouth opening to the inflatable chest portion when the head and neck portion is not sufficiently rearwardly inclined relative to the chest portion as is required in real life cardiopulmonary resuscitation and to permit air flow when the head and neck portion is rearwardly inclined as required.

The mannequin may also include a resiliently compressible simulated human heart portion located beneath the flexible chest wall member.

One embodiment of the invention will now be described, by way of example, with reference to the accompanying drawings, of which;

FIG. 2 is a side view, partly in section taken along the line 2—2 of FIG. 1,

Figure 1:
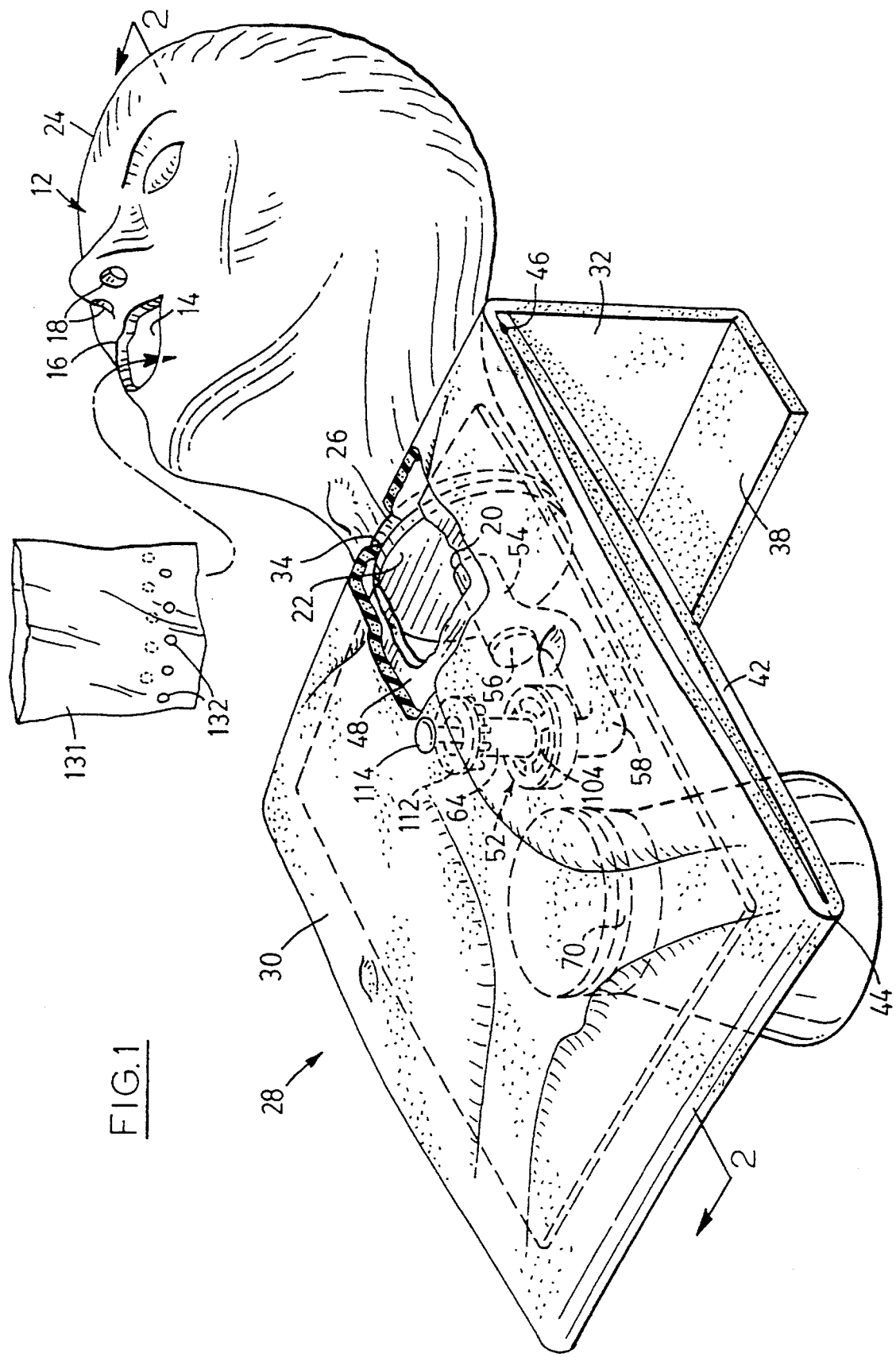
FIG. 1 is a prespective view, partly in section, of a CPR mannequin in a non-operative position.
Figure 9:
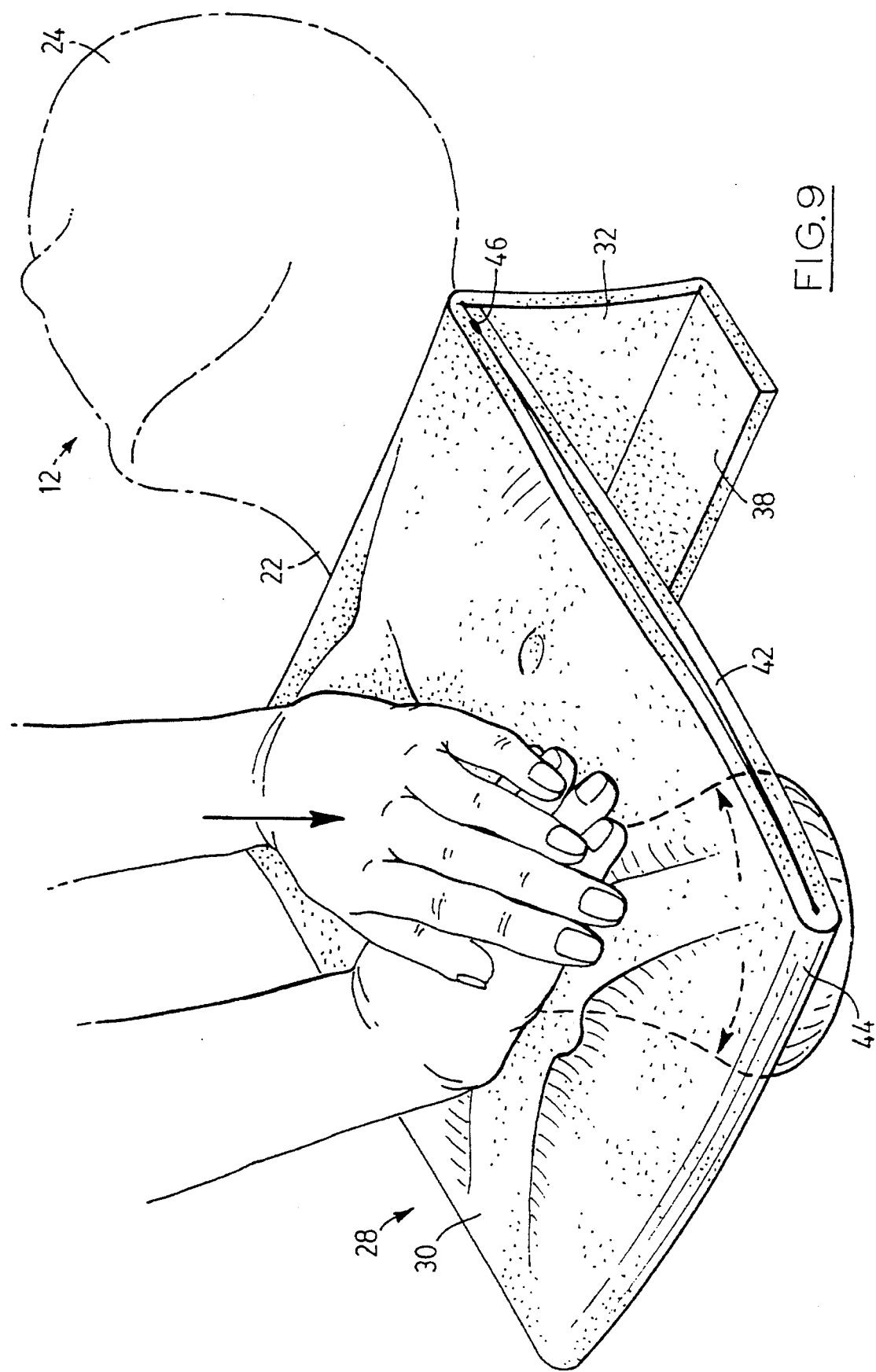

FIG. 3 is a sectional side view of the air flow prevention device in a flow-preventing position, FIG. 4 is a view simular to FIG. 2 but showing the mannequin in an operative position for practising pulmonary resuscitation, FIG. 5 is a view simular to FIG. 3 but showing the air flow prevention device in a flow-permitting position, FIG. 6 is a sectional side view of the flow control valve, FIG. 7 is a sectional side view of the releasable retainer and associated parts in the released configuration, FIG. 8 is a simular view but showing the releasable retainer in the retained configuration, and FIG. 9 is a perspective view of the CPR mannequin being used for practising cardiac resuscitation.

Referring to the drawings, a CPR mannequin for practising cardiopulmonary resuscitation of a human has a hollow blow-molded simulated human head and neck portion 12, the hollow interior 14 thereof forming an air passage extending from a mouth opening 16 and nose openings 18 to a neck opening 20 in an end of the neck 22 remote from the head 24. The neck 22 has an external peripheral groove 26 near the end remote from the head 24 for attachment to the neck 22 of an inflatable simulated chest portion 28 in a manner which will be described in more detail later.

The inflatable chest portion 28 has a flexible upper chest wall member 30 which rises and falls with inflation and deflation of the chest portion 28. The upper chest wall member 30 has an attachment extension 32 which extends substantially vertically downwardly from the end of the chest wall member 30 near the neck 22. The attachment extension 32 has a circular aperture 34 into which the neck 22 can be snap fitted with the aperture edge seating in the peripheral groove 26 to secure the chest portion 28 to the neck 22. The attachment extension 32 has a support extension 38 extending from the lower end thereof under the upper wall member 30, the support extension 38 engaging the floor 40 on which the mannequin rests.

The upper wall member 30 also has an extension from the end thereof remote from the neck 22 which is reversely bent so as to form a lower chest member 42 beneath the upper chest wall member 30. The lower chest wall member 42 extends under the upper chest wall member 30 as far as the attachment extension 32. The lower chest wall member 42 is not attached to the upper wall chest member 30 except at its end, namely at the reverse bend 44 and at the opposite end where the lower chest wall member 42 is secured to the upper chest wall member 30 adjacent the attachment extension 32 in any suitable manner as indicated at 46. The side edges of the lower chest wall member 42 are not attached to the side edges of the upper chest wall member 30. The upper and lower chest wall members 30, 42, the attachment extension 32 and the support extension 38 may be made of a suitable foamed plastic material which is sufficiently flexible to enable the upper chest wall member 30 to rise and fall and which is also sufficiently rigid to form an effective attachment portion 32 and support portion 38.

A simulated lung in the form of a flexible bag 48 is inserted between the upper chest wall member 30 and the lower chest wall member 42 and its interior is connected to the air passage 14 in the head and neck portion 22 by a further air passage including an angle-resposive air flow prevention device 50 and a flow control valve 52. The air flow prevention device 50 is located in a straight rigid tube 54 extending from the neck opening 20 and integral with the neck 22. The straight tube 54 has a plug 56 at the end opposite to the neck end to enable the air flow prevention device 50 to be inserted therein. One end of a rigid U-shaped tube 58 extends from the plug end of the straight tube 54 and is integral therewith. The other end of the U-shaped tube 58 is connected to the inlet 60 of the flow control valve 52. The flow control 52 has a main outlet 62 connected by a flexible tube 64 to the flexible lung bag 48, the flexible tube 64 passing through an aperture 65 in the lower chest wall member 42.

The CPR mannequin also includes a simulated heart portion 68 which in use rests on the floor 40 and is located under the chest portion 28. The heart portion 68 has a peripheral groove 70 near its upper end which is a snap fit in an aperture 72 in the lower chest wall member 42. The heart portion 68 is a hollow plastic molding and is designed to be resiliently compressible in a manner which will simulate a human heart so far as cardiac resuscitation is concerned.

The air flow prevention device 50, shown more particularly in FIGS. 3 and 5, has an elongated housing 74 with an enlarged end portion 76 which is a force-fit in the rigid straight tube 54. The housing 74 is hollow with the end 78 near the neck 22 being closed and the opposite end 80 being open. Inlet apertures 82 are provided in a medial portion of the housing 74. The housing end 80 has an annular valve seat 84 which before fitting thereto enables a ball valve member 86 to be inserted into the housing 74 and then retained therein by installation of the valve seat 84. The inner wall of the housing 74 is shaped so that, when the mannequin is in the straight horizontal position shown in FIG. 2, see also FIG. 3, a portion 88 of the inner wall adjacent the valve seat 84 is horizontal and a part 90 of the inner wall extending from the inlet apertures 82 towards the closed end 78 is downwardly inclined in a direction away from the neck opening 20.

It will be seen that, when the air flow prevention device 50 is oriented in the manner shown in FIGS. 2 and 3, the ball valve member 86 has run down the inclined wall portion 90 onto the horizontal wall portion 88 into engagement with the valve seat 84, thereby preventing air flow therethrough. However, when the head 24 is tilted backwardly to the position required for pulmonary resuscitation, as shown is FIGS. 4 and 5, it will be seen that the ball valve member 86 has run down now inclined wall portion 88 and now horizontal wall portion 90 to a position where air flow from the inlets 82 through the annular valve seat 84 can now occur.

The flow control valve 52 is shown in more detail in FIG. 6 and has a 2-part housing, namely a first housing part 92 which has inlet 60 and a second housing part 94 which has main outlet 62. Two housing parts 92, 94 have a screw-threaded connection 96, and a flexible diaphragm 98 has its peripheral edge secured between the two housing parts 92, 94. The diaphragm 98 has a central duckbill inlet valve member 100. When air is blown through the inlet 60, the air pressure opens the duckbill valve member 100 as indicated in dotted outline and hence air passes to the main outlet 62 and thereby passes to the lung bag 48. When air is flowing from the lung bag 48 back to the control valve 52, the duckbill valve member 100 is not opened. Instead, the air pressure moves the diaphragm 98 away from an annular valve seat 102 formed by housing part 94 at the bottom of outlet 62, as also indicated in dotted outline, so that air passes from the lung bag 48 to the atmosphere through apertures 104 in the second housing part 94.

It was previously mentioned that the flexible tube 64 connects the valve outlet 62 to a lung bag 48. This is shown in more detail in FIGS. 7 and 8. A tubular connector 106 extends from the flexible tube 64 through a aperture 107 to a lower side 108 of the lung bag 48. The connector 106 has a peripheral flange 110 which overlaps the aperture 107 in the lung bag 48. A retaining nut 112 is screwed onto the connector 106 to enable the edge portion of the lower side 108 of the lung bag 48 surrounding the aperture 107 to be clamped between the connector flange 110 and the retaining nut 112.

A releasable retainer pin 114 carried by the upper chest wall member 30 projects downwardly therefrom so as to pass through the aperture 116 in the upper side 118 of the lung bag 48, the edges of the aperture 116 being reinforced by a flat annular ring 120. The lower end of the retainer pin 114 has an enlarged head 122 which is shaped to be a snap fit in a central aperture 124 in a partition 126 extending across the interior of connector 106, the partition 126 also having a series of apertures 128 at positions around the central aperture 124.

When the CPR mannequin is being used for training for adult resuscitation, the retaining pin 114 is not engaged in partition 126, this configuration being shown in FIG. 7. When the CPR mannequin is being used for training for a child resuscitation, the retaining pin 114 is engaged in partition 126 as shown in FIG. 8 the effective air capacity of lung bag 48 thereby being reduced to a volume representative of the lung capacity of a child. It will be noted that the retaining pin 114 has a head 129 engaging the top surface of the upper chest wall member 30 and a friction washer 130 engaging the lower surface of the upper chest wall member 30 to secure the pin 114 to the upper chest wall member 30.

Operation of the CPR mannequin will be readily apparent to a person skilled in the art from the foregoing description. It will therefore suffice to mention that, for training for adult resuscitation, the mannequin is in the position shown in FIG. 4 with the head 24 tilted back to open the air flow prevention valve 50, thereby simulating the opening of the airway in the throat of a human, and with the retaining pin 114 free as shown in FIG. 7. Air is blown into the mouth opening 16 of the mannequin by a trainee who at the same time closes the nose openings 18. For hygenic reasons, a hygenic thin plastic bag 131 with an open top and apertures 132 in its lower end is inserted into the mouth opening 16 so that the actual mouth opening 16 is not contacted by the trainee, a different hygenic bag 131 being used for each trainee.

Air blown through the mouth opening 16 thus passes through the air flow prevention device 50 and through the flow control valve 52. The lung bag 48 is thereby inflated, and such inflation causes the upper chest wall member 30 to rise. When the lung bag 48 is deflated by hand pressure on the upper chest wall member 30, air from the lung bag 48 is passed by the flow control valve 52 directly to the atmosphere. Thus, air from the lung bag 48 does not pass back to the mouth and nose openings 16, 18, this feature of course also being important for hygenic reasons.

It will be seen that, as the lung bag 48 inflates, reinforcing washer 120 on the lung bag 48 is pushed against the retaining washer 128 on the pin 114 to limit air leakage through the lung bag aperture 116.

When the mannequin is used for teaching child resuscitation, retaining pin 114 is engaged in partition 126 as indicated in FIG. 8. When air is blown into the mouth opening 16, the reduced lung capacity is very quickly reached and further blowing into the mouth opening 16 will cause air pressure in the lung bag 48 to increase to such an extent that the retaining pin 116 is popped out of engagement with the partition 126, thereby indicating to the trainee the amount of blowing suitable for child pulmonary resuscitation.

The cardiac part of CPR training is carried out in the manner indicated in FIG. 9, with the simulated heart portion 48 giving the trainee an indication of the force necessary for cardiac resuscitation.

The advantages of the invention will be readily apparent to a person skilled in the art from the foregoing description of the preferred embodiment, the scope of the invention being defined in the appended claims.

I claim:

1. A CPR mannequin for practising cardiopulmonary resuscitation of a human comprising:

a simulated human head provided with a mouth opening and a neck portion provided with a neck opening at the end of the neck remote from said head, an air passage extending from said mouth opening to said neck opening;

an inflatable simulated human chest portion secured to the neck and including an upper flexible wall member, a lower wall member and a flexible bag therebetween, said inflatable chest portion comprising a releasable retainer which operates before release to reduce the air capacity of the chest portion to a volume representative of the lung capacity of a human child, said releasable retainer being released by air pressure caused by continued blowing of air into the mouth opening when the chest portion has been inflated to an extent representative of the lung capacity of a human child;

a further air passage connecting the air passage in the neck to the flexible bag;

said releasable retainer secured to the upper flexible wall member and passing through the flexible bag into releasable snapping engagement with a connector providing said further air passage; and said upper flexible wall member simulating a chest which rises and falls with inflation and deflation of the flexible bag.

2. A CPR mannequin according to claim 1 also including a resiliently compressible simulated human heart portion located beneath the lower chest wall member.

* * * * *